United States Patent
Rao et al.

(10) Patent No.: US 12,211,181 B2
(45) Date of Patent: Jan. 28, 2025

(54) IMAGE DISPLAY METHOD AND IMAGE DISPLAY DEVICE FOR REDUCING CROSSTALK

(71) Applicant: TCL China Star Optoelectronics Technology Co., Ltd., Guangdong (CN)

(72) Inventors: Yang Rao, Guangdong (CN); Woosuk Ha, Guangdong (CN); Tao He, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 405 days.

(21) Appl. No.: 17/435,053

(22) PCT Filed: Dec. 29, 2020

(86) PCT No.: PCT/CN2020/140929
§ 371 (c)(1),
(2) Date: Aug. 31, 2021

(87) PCT Pub. No.: WO2022/068114
PCT Pub. Date: Apr. 7, 2022

(65) Prior Publication Data
US 2022/0327667 A1    Oct. 13, 2022

(30) Foreign Application Priority Data
Sep. 30, 2020   (CN) .......................... 202011063503.5

(51) Int. Cl.
*G06K 9/00*   (2022.01)
*G06T 5/20*   (2006.01)
(Continued)

(52) U.S. Cl.
CPC .................. *G06T 5/70* (2024.01); *G06T 5/20* (2013.01); *G06T 7/13* (2017.01)

(58) Field of Classification Search
CPC ........... G06T 2207/30121; G06T 2207/30168; G06T 2200/12; G06T 15/503; G06T 2207/20192; G06T 7/12; G06T 7/13; G06T 5/003; G06T 3/403; G06T 5/002; G06T 5/50; G06T 2207/10024; G06T 7/90; G06T 5/009; G06T 5/007; G06T 5/20; G06T 2207/20024; G06T 7/254;
(Continued)

(56) References Cited

U.S. PATENT DOCUMENTS

| | | | |
|---|---|---|---|
| 6,608,942 B1 * | 8/2003 | Le | G06T 7/13 382/199 |
| 8,259,235 B2 | 9/2012 | Chen et al. | |
| 2007/0206025 A1 * | 9/2007 | Oka | G06T 11/40 345/611 |

(Continued)

FOREIGN PATENT DOCUMENTS

| | | |
|---|---|---|
| CN | 104916246 | 9/2015 |
| CN | 107248148 | 10/2017 |
| CN | 110444157 | 11/2019 |

*Primary Examiner* — Atiba O Fitzpatrick

(57) ABSTRACT

The present application provides an image display method and an image display device. The image display method performs a gray-scale compensation on each data line, thereby preventing a problem of color crosstalk in a display panel. At the same time, an original image in the display panel is edge blurred, which can reduce an impact of the color crosstalk.

17 Claims, 3 Drawing Sheets

(51) Int. Cl.
*G06T 5/70* (2024.01)
*G06T 7/13* (2017.01)

(58) Field of Classification Search
CPC .......... G06T 2207/20224; G06T 2207/20216; G09G 2320/02–0295; G09G 2320/0209; G09G 2320/0214; G09G 5/02; G09G 2320/0666; G09G 2340/06; G09G 5/06; G09G 2320/0693; G09G 3/2003; G09G 2320/0242; G09G 5/026; G09G 2320/0626; H04N 9/646; H04N 13/125; H04N 5/21–213; H04N 1/58; H04N 1/409; H04N 1/4092; H04N 5/205; H04N 5/208; H04N 1/60–628; G06K 2215/006; G06K 15/1844; G06K 15/1223; G06V 10/56; G06V 40/162
See application file for complete search history.

(56) References Cited

U.S. PATENT DOCUMENTS

| | | | |
|---|---|---|---|
| 2010/0310189 A1* | 12/2010 | Wakazono | H04N 5/142 |
| | | | 382/258 |
| 2013/0329098 A1 | 12/2013 | Lim et al. | |
| 2014/0307979 A1* | 10/2014 | Yamamoto | G06T 5/002 |
| | | | 382/274 |
| 2016/0247262 A1* | 8/2016 | Li | G06T 3/4053 |
| 2016/0343283 A1* | 11/2016 | He | G09G 3/2051 |
| 2018/0061062 A1* | 3/2018 | Genda | H04N 19/182 |
| 2018/0189932 A1* | 7/2018 | Kopysov | G06T 5/002 |
| 2019/0132528 A1* | 5/2019 | Nashizawa | G06T 7/13 |
| 2019/0318455 A1* | 10/2019 | Gruen | G06T 5/50 |
| 2019/0333201 A1* | 10/2019 | Liu | G06T 5/50 |
| 2021/0398253 A1* | 12/2021 | Marrs | G06T 5/002 |
| 2022/0005157 A1* | 1/2022 | Shu | G06T 3/4069 |

* cited by examiner

IMAGE DISPLAY METHOD AND IMAGE DISPLAY DEVICE FOR REDUCING CROSSTALK

RELATED APPLICATIONS

This application is a National Phase of PCT Patent Application No. PCT/CN2020/140929 having International filing date of Dec. 29, 2020, which claims the benefit of priority of Chinese Patent Application No. 202011063503.5 filed on Sep. 30, 2020. The contents of the above applications are all incorporated by reference as if fully set forth herein in their entirety.

FIELD AND BACKGROUND OF THE INVENTION

The present disclosure relates to field of display technologies, in particular to an image display method and an image display device.

With development of display technologies, users have higher and higher requirements for display quality.

Current display panels are prone to a problem of color crosstalk when displaying images. If the color crosstalk occurs in display images, the display quality will be affected.

Therefore, providing a method that can reduce the color crosstalk problem of the display images has become a technical problem to be solved urgently by those skilled in the art.

SUMMARY OF THE INVENTION

Embodiments of the present disclosure provide an image display method and an image display device, which can reduce color crosstalk of display images.

An embodiment of the present disclosure provides an image display method, which comprises:

obtaining an original image of a display image in a display panel;

performing a first filtering process on the original image to obtain a first filtered image;

performing a difference calculation on the original image and the first filtered image to obtain an edge information image;

determine filtering parameters of a second filtering process based on a maximum pixel value of the edge information image;

performing the second filtering process on the original image according to the filtering parameters to obtain an edge blurred image; and displaying the blurred edge image.

In some embodiments, the first filtering process is a mean filtering process.

In some embodiments, the step of performing the first filtering process on the original image to obtain the first filtered image comprises:

performing a mean filtering process of three rows and three columns on each pixel in the original image to obtain the first filtered image.

In some embodiments, the step of determining the filtering parameters of the second filtering process based on the maximum pixel value of the edge information image comprises:

forming a filter of five rows and five columns through preprocessing, wherein a pixel value of each position point in the filter represents a filtering parameter; and performing a conversion calculation on the maximum pixel value of the edge information image to obtain the pixel value of each position point in the filter.

In some embodiments, the step of performing the second filtering process on the original image according to the filtering parameters to obtain the edge blurred image comprises:

performing a summation calculation of the original image and the filtering parameters to obtain the edge blurred image.

In some embodiments, before the step of displaying the edge blurred image, the image display method further comprises:

performing a gray-scale compensation on pixels corresponding to data lines to be compensated in the display panel;

the step of displaying the edge blurred image comprises:

displaying the edge blurred image by the pixels after the gray-scale compensation.

In some embodiments, the step of performing the gray-scale compensation on the pixels corresponding to the data lines to be compensated in the display panel comprises:

determining a coordinate value of each of the data lines to be compensated in a vertical axis direction;

calculating an average gray-scale of all data lines greater than the coordinate value in the vertical axis direction to obtain a first average gray-scale;

calculating an average gray-scale of all data lines less than the coordinate value in the vertical axis direction to obtain a second average gray-scale;

calculating a compensated gray-scale according to the first average gray-scale and the second average gray-scale; and performing the gray-scale compensation on the pixels corresponding to each of the data lines to be compensated based on the compensated gray-scale.

The step of calculating the compensated gray-scale according to the first average gray-scale and the second average gray-scale comprises: performing the difference calculation on the first average gray-scale and the second average gray-scale to obtain the compensated gray-scale.

In some embodiments, the step of calculating the compensated gray-scale according to the first average gray-scale and the second average gray-scale comprises:

subtracting the second average gray-scale from the first average gray-scale and multiplying by a floating parameter to obtain the compensated gray-scale, wherein the floating parameter is between 0 and 5.

In some embodiments, before the step of determining the coordinate value of each of the data lines to be compensated in the vertical axis direction comprises:

counting a horizontal axis coordinate and a vertical axis coordinate of each data line.

An embodiment of the present disclosure further provides an image display device, comprising:

an acquisition unit configured to obtain an original image of a display image in a display panel;

a first processing unit configured to perform a first filtering process on the original image to obtain a first filtered image;

a calculation unit configured to subtract the first filtered image from the original image to obtain an edge information image;

a determination unit configured to determine filtering parameters of a second filtering process based on a maximum pixel value of the edge information image;

a second processing unit configured to perform the second filtering process on the original image according to the filtering parameters to obtain an edge blurred image;

a compensation unit configured to perform a gray-scale compensation on data lines to be compensated in the display panel; and a display unit configured to display the edge blurred image.

In some embodiments, the first processing unit is specifically configured to: perform a mean filtering process of three rows and three columns on each pixel in the original image to obtain the first filtered image.

In some embodiments, the calculation unit is specifically configured to subtract each pixel of the first filtered image from each pixel of the original image to obtain the edge information image.

In some embodiments, the determination unit is specifically configured to: form a filter of five rows and five columns through preprocessing, wherein a pixel value of each position point in the filter represents a filtering parameter; and perform a conversion calculation on the maximum pixel value of the edge information image to obtain the pixel value of each position point in the filter.

In some embodiments, the second processing unit is specifically configured to: perform a summation calculation of the original image and the filtering parameters to obtain the edge blurred image.

In some embodiments, the compensation unit is specifically configured to:

determine a coordinate value of each of the data lines to be compensated in a vertical axis direction;

calculate an average gray-scale of all data lines greater than an average gray-scale value to obtain a first average gray-scale;

calculate an average gray-scale of all data lines less than the average gray-scale value to obtain a second average gray-scale;

calculate a compensated gray-scale according to the first average gray-scale and the second average gray-scale; and perform the gray-scale compensation on each of the data lines based on the compensated gray-scale.

In some embodiments, the compensation unit is further configured to: count a horizontal axis coordinate and a vertical axis coordinate of each of the data lines.

In some embodiments, the compensation unit is further configured to: perform a difference calculation between the first average gray-scale and the second average gray-scale to obtain the compensated gray-scale.

In some embodiments, the compensation unit is further configured to subtract the second average gray-scale from the first average gray-scale and multiply by a floating parameter to obtain the compensated gray-scale, wherein the floating parameter is between 0 and 5.

An embodiment of the present disclosure further provides a storage medium, wherein the storage medium stores a plurality of instructions, and the instructions are suitable for loading by a processor to execute the steps in any of the above image display methods.

The image display method provided by the embodiment of the present disclosure first obtains the original image of the display image in the display panel, performs the first filtering process on the original image to obtain the first filtered image, performs the difference calculation between the original image and the first filtered image to obtain the edge information image, determines the filtering parameters of the second filtering process based on the maximum pixel value of the edge information image, performs the second filtering process on the original image according to the filtering parameters, obtains the edge blurred image, performs the gray-scale compensation on the data lines to be compensated in the display panel, and displays the edge blurred image after the gray-scale compensation. The display method of the present disclosure performs the gray-scale compensation on each data line, which prevents the problem of color crosstalk. At the same time, in the present disclosure, the original image in the display panel is edge blurred, which can reduce an impact of the color crosstalk.

BRIEF DESCRIPTION OF THE SEVERAL VIEWS OF THE DRAWINGS

In order to more clearly explain the technical solutions in the embodiments of the present disclosure, the following will briefly introduce the drawings required in the description of the embodiments. Obviously, the drawings in the following description are only some embodiments of the present disclosure. For those skilled in the art, without paying any creative work, other drawings can be obtained based on these drawings.

DESCRIPTION OF SPECIFIC EMBODIMENTS OF THE INVENTION

Technical solutions in the embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

In the embodiments of the present disclosure, it should be understood that terms such as "including" or "having" are intended to indicate the existence of features, numbers, steps, actions, components, parts, or combinations thereof disclosed in this specification, and are not intended to exclude the existence or the addition of one or more other features, numbers, steps, actions, components, parts or combinations thereof.

Embodiments of the present disclosure provide an image display method and an image display device. The image display method will be described in detail below.

Figure 1:
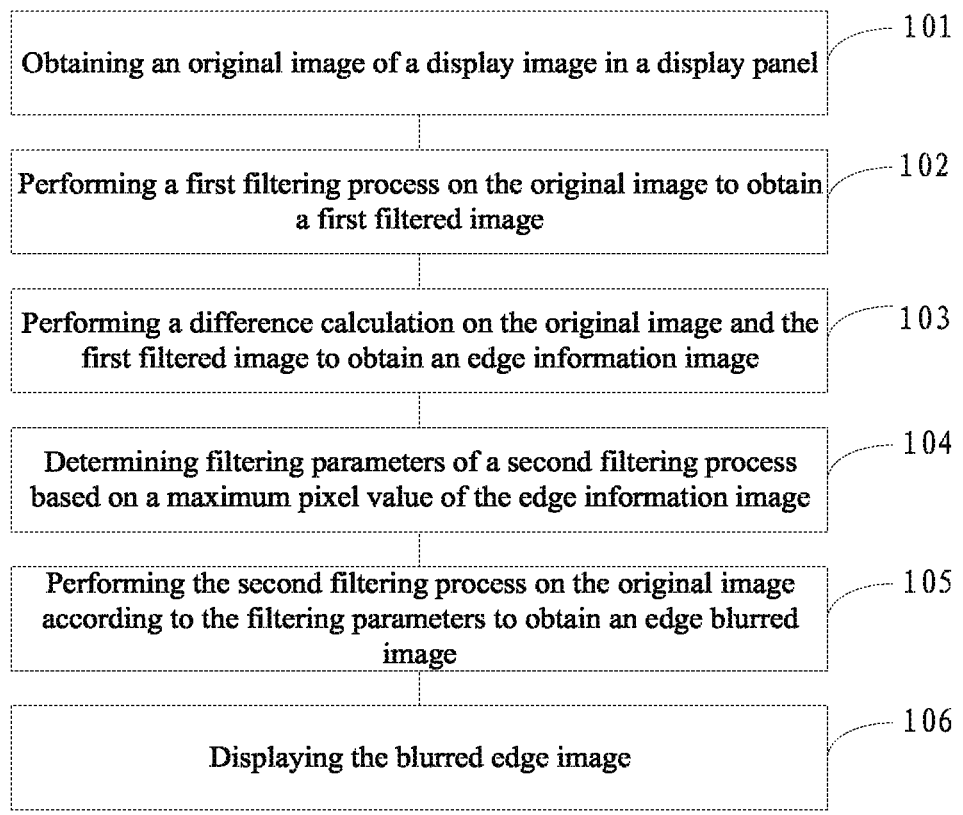
FIG. 1 is a schematic flowchart of an image display method provided by an embodiment of the present disclosure.

Please refer to FIG. 1, which is a schematic flowchart of an image display method provided by an embodiment of the present disclosure. Wherein, the image display method comprises following steps:

101, obtaining an original image of a display image in a display panel.

It should be noted that the original image of the display image refers to an image directly obtained by the display panel, that is, the original image has not undergone operations such as processing or editing.

102, performing a first filtering process on the original image to obtain a first filtered image.

It should be noted that the first filtering process may be a mean filtering process. Specifically, a target pixel and surrounding pixels in the original image are averaged, and an average value is assigned to the target pixel to achieve filtering purposes. Each pixel in the original image can be used as the target pixel. After performing the mean filtering process on the original image, the first filtered image can be obtained.

Specifically, in some embodiments, the step of performing the first filtering process on the original image to obtain the first filtered image specifically comprises steps of:

(1) performing a mean filtering process of three rows and three columns on each pixel in the original image to obtain the first filtered image.

It should be noted that, performing the mean filtering process of three rows and three columns on each pixel in the original image means taking the target pixel as a center, taking pixels of three rows and three columns around the target pixel for a mean process, and assigning the average value to the target pixel, and then sequentially performing the mean process on each target pixel in the original image to obtain the first filtered image.

103, performing a difference calculation between the original image and the first filtered image to obtain an edge information image.

It should be noted that the difference calculation is performed between the original image and the first filtered image to obtain the edge information image. Specifically, each pixel of the first filtered image is subtracted from each pixel of the original image to obtain the edge information image.

104, determining filtering parameters of a second filtering process based on a maximum pixel value of the edge information image.

It should be noted that a filter may be preset, and each parameter in the filter can be calculated based on the maximum pixel value of the edge information image. Wherein, the parameters of the filter comprise a center parameter and edge parameters surrounding the center parameter, and values of the edge parameters are all same. Therefore, the center parameter can be obtained by substituting the maximum pixel value of the edge information image into a calculation formula of the center parameter, and the edge parameters can be obtained by substituting the maximum pixel value of the edge information image into a calculation formula of the edge parameters.

In some embodiments, the step of determining the filtering parameters of the second filtering process based on the maximum pixel value of the edge information image specifically comprises steps of:

(1) forming a filter of five rows and five columns through preprocessing, wherein a pixel value of each position point in the filter represents a filtering parameter.

Figure 2:
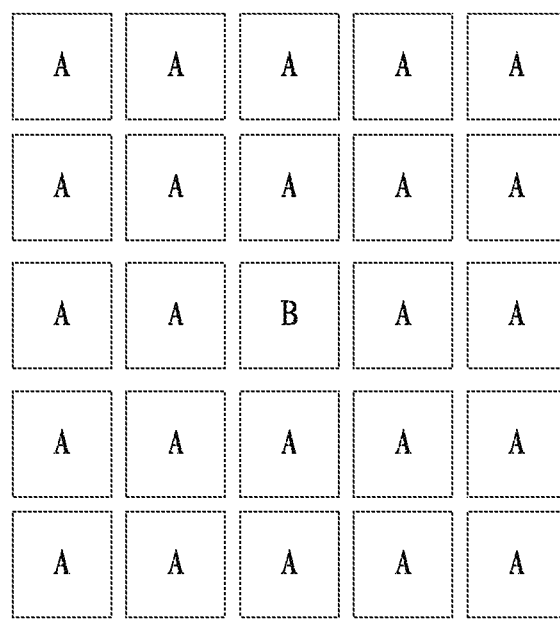
FIG. 2 is a schematic structural diagram of a filter in the image display method provided by the embodiment of the present disclosure.

It should be noted that the filter of five rows and five columns is formed through the preprocessing, as shown in FIG. 2, wherein the filter comprises one center parameter B and 24 edge parameters A. The filtering parameters can be obtained by calculating the center parameter and the edge parameters.

(2) performing a conversion calculation on the maximum pixel value of the edge information image to obtain the pixel value of each position point in the filter.

It should be noted that, please continue to refer to FIG. 2, wherein the calculation formula of the center parameter B is: B=1−P/255, and the calculation formula of the edge parameters is A=P/255/24. Specifically, P is the maximum pixel value of the edge information image. Therefore, the pixel value of each position point in the filter can be obtained by above formulas, and thus the filtering parameters can be obtained.

105, performing the second filtering process on the original image according to the filtering parameters to obtain an edge blurred image.

It should be noted that the filtering process is performed on each pixel in the original image with the filter, so that the edge blurred image can be obtained.

Specifically, a summation calculation can be performed on each pixel in the original image and the filtering parameters to obtain the edge blurred image.

In some embodiments, the image display method further comprises: performing a gray-scale compensation on pixels corresponding to data lines to be compensated in the display panel.

Figure 3:
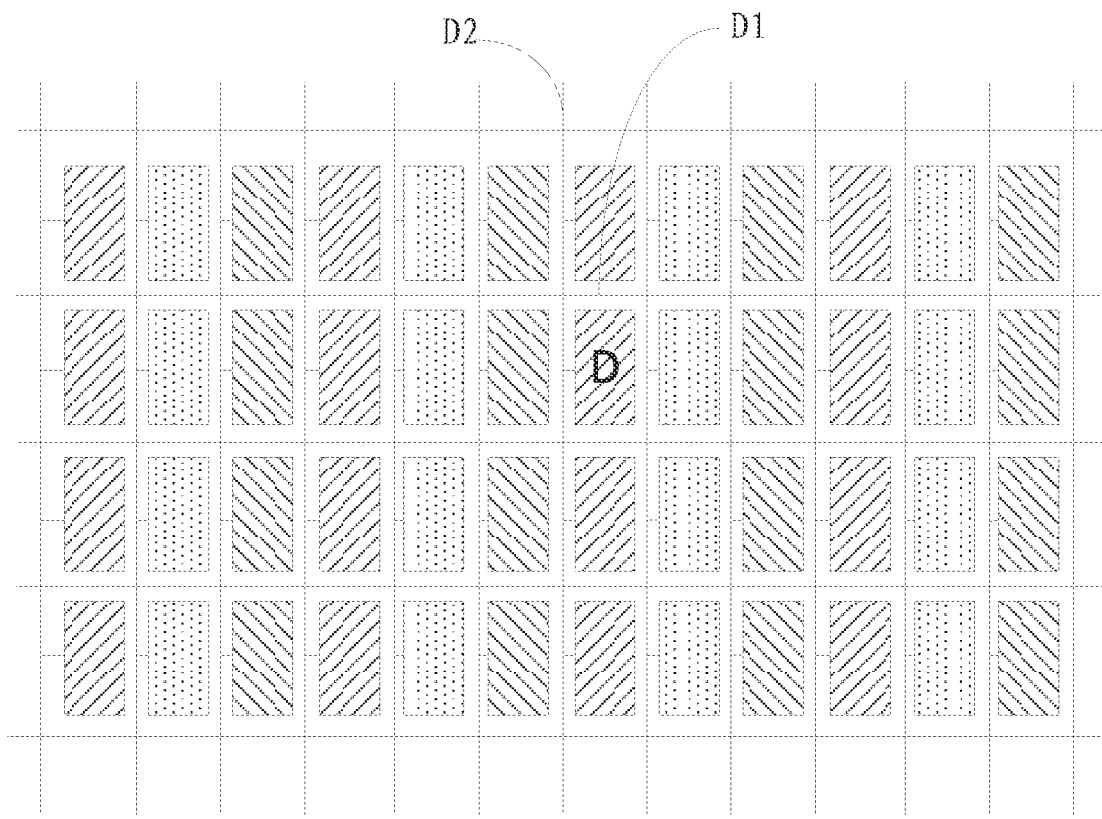
FIG. 3 is a schematic structural diagram of a display panel in the image display method provided by the embodiment of the present disclosure.

It should be noted that, as shown in FIG. 3, the display panel comprises a plurality of data lines, the data lines are intersected to form a plurality of pixel regions, and each pixel region is provided with a pixel. For example, after data lines to be compensated D1 and D2 are determined, a corresponding pixel D can be determined based on the data lines to be compensated D1 and D2, and compensation data is input to the corresponding pixel D, so that the gray-scale compensation of the pixels corresponding to the data lines to be compensated can be achieved.

The step of displaying the edge blurred image comprises:

Displaying the edge blurred image by the pixels after the gray-scale compensation.

It should be noted that the gray-scale compensation is performed on the pixels corresponding to the data lines to be compensated in the display panel to prevent a problem of color crosstalk in the display panel.

In some embodiments, the step of performing the gray-scale compensation on the pixels corresponding to the data lines to be compensated in the display panel specifically comprises steps of:

(1) determining a coordinate value of each of the data lines to be compensated in a vertical axis direction.

It should be noted that, determining the coordinate value of each data line to be compensated in the vertical axis direction of the display panel comprises dividing other data lines into two parts based on the coordinate value in the vertical axis direction, one part comprises data lines greater than the coordinate value in the vertical axis direction, and the other part comprises data lines less than the coordinate value in the vertical axis direction. Specifically, it comprises a step of: counting a horizontal axis coordinate and a vertical axis coordinate of each data line.

It should be noted that the horizontal axis coordinate and the vertical axis coordinate of each data line are counted. Specifically, a counting can be performed through a timing controller (TCON).

(2) calculating an average gray-scale of all the data lines greater than the coordinate value in the vertical axis direction to obtain a first average gray-scale.

It should be noted that gray-scales of all the data lines greater than the coordinate value in the vertical axis direction are averaged to obtain the first average gray-scale. For example, if there are d1, d2, d3, d4, d5 greater than the coordinate value in the vertical axis direction, the first average gray-scale is Next_Gray=(d1+d2+d3+d4+d5)/5.

(3) calculating an average gray-scale of all the data lines less than the coordinate value in the vertical axis direction to obtain a second average gray-scale.

It should be noted that gray-scales of all data lines less than the coordinate value in the vertical axis direction are averaged to obtain the second average gray-scale. For example, if there are d6, d7, d8, d9, d10 less than an average gray-scale value, the second average gray-scale is Pre_Gray=(d6+d7+d8+d9+d10+)/5.

(4) calculating a compensated gray-scale according to the first average gray-scale and the second average gray-scale.

It should be noted that a difference calculation is performed between the first average gray-scale and the second average gray-scale to obtain the compensated gray-scale.

(5) performing the gray-scale compensation on the pixels corresponding to each of the data lines to be compensated based on the compensated gray-scale.

It should be noted that the pixels corresponding the data lines to be compensated are compensated by the compensated gray-scales, so that the display image is not prone to the problem of the color crosstalk.

In some embodiments, calculating one compensated gray-scale according to the first average gray-scale and the second average gray-scale specifically comprises a step of:

Subtracting the second average gray-scale from the first average gray-scale and then multiplying by a floating parameter to obtain the compensated gray-scale, wherein the floating parameter is between 0 and 5.

It should be noted that a calculation formula of the compensated gray-scale is: $\Delta Gray=(Next\_Gray-Pre\_Gray)*N$, wherein, $\Delta Gray$ is the compensated gray-scale, Next_Gray is the first average gray-scale, Pre_Gray is the second average gray-scale, and N is the floating parameter. It should be understood that the floating parameter can be flexibly adjusted as needed.

106, displaying the edge blurred image.

It should be noted that the edge blurred image after compensation is displayed on the display panel, which can prevent the problem of the color crosstalk, and at the same time, it is not easy to observe the color crosstalk in a displayed image.

The image display method provided by the present disclosure first obtains the original image of the display image in the display panel, performs the first filtering process on the original image to obtain the first filtered image, performs the difference calculation between the original image and the first filtered image to obtain the edge information image, determines the filtering parameters of the second filtering process based on the maximum pixel value of the edge information image, performs the second filtering process on the original image according to the filtering parameters to obtain the edge blurred image, performs the gray-scale compensation on the data lines to be compensated in the display panel, and displays the edge blurred image after the gray-scale compensation. The display method of the present disclosure performs the gray-scale compensation on each data line, which prevents the problem of the color crosstalk. At the same time, in the present disclosure, the original image in the display panel is edge blurred, which can reduce an impact of the color crosstalk.

In order to facilitate better implementation of the image display method provided by the embodiment of the present disclosure, an embodiment of the present disclosure also provides a device based on the above image display method (referred to as an image display device). Meanings of terms are the same as in the above image display method, and specific implementation details can refer to descriptions in method embodiments.

Figure 4:
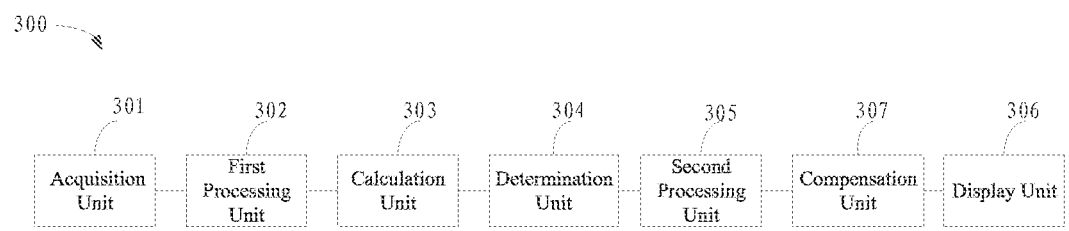
FIG. 4 is a schematic structural diagram of an image display device provided by an embodiment of the present disclosure.

Please refer to FIG. 4, which is a schematic structural diagram of an image display device provided by an embodiment of the present disclosure. The image display device 300 may comprise an acquisition unit 301, a first processing unit 302, a calculation unit 303, a determination unit 304, a second processing unit 305, a compensation unit 307, and a display unit 306, which may be specifically as follows:

The acquisition unit 301 configured to obtain an original image of a display image in a display panel;

The first processing unit 302 configured to perform a first filtering process on the original image to obtain a first filtered image;

The calculation unit 303 configured to subtract the first filtered image from the original image to obtain an edge information image;

The determination unit 304 configured to determine filtering parameters of a second filtering process based on a maximum pixel value of the edge information image;

The second processing unit 305 configured to perform the second filtering process on the original image according to the filtering parameters to obtain an edge blurred image; and The display unit 306 configured to display the edge blurred image.

Alternatively, in some embodiments, the first processing unit 302 is specifically configured to:

Perform a mean filtering process of three rows and three columns on each pixel in the original image to obtain the first filtered image.

Alternatively, in some embodiments, the determination unit 304 is specifically configured to:

Form a filter of five rows and five columns through preprocessing, wherein a pixel value of each position point in the filter represents a filtering parameter; and Perform a conversion calculation on the maximum pixel value of the edge information image to obtain the pixel value of each position point in the filter.

Alternatively, in some embodiments, the second processing unit 305 is specifically configured to:

Perform a summation calculation of the original image and the filtering parameters to obtain the edge blurred image.

Alternatively, the image display device further comprises the compensation unit 307:

Wherein the compensation unit 307 is configured to perform a gray-scale compensation on pixels corresponding to data lines to be compensated in the display panel, and the display unit 306 is configured to display the edge blurred image by the pixels after the gray-scale compensation.

Alternatively, in some embodiments, the compensation unit 307 is specifically configured to:

Determine a coordinate value of each of the data lines to be compensated in a vertical axis direction;

Calculate an average gray-scale of all data lines greater than an average gray-scale value to obtain a first average gray-scale;

Calculate an average gray-scale of all data lines less than the average gray-scale value to obtain a second average gray-scale;

Calculate a compensated gray-scale according to the first average gray-scale and the second average gray-scale; and Perform the gray-scale compensation on each data line based on the compensated gray-scale.

Alternatively, in some embodiments, the compensation unit 307 is specifically configured to:

Subtract the second average gray-scale from the first average gray-scale and multiply by a floating parameter to obtain the compensated gray-scale, wherein the floating parameter is between 0 and 5.

Alternatively, in some embodiments, the compensation unit 307 is specifically configured to: count a horizontal axis coordinate and a vertical axis coordinate of each data line.

The image display device provided in the present disclosure comprises the acquisition unit 301, the first processing unit 302, the calculation unit 303, the determination unit 304, the second processing unit 305, and the display unit 306. First, the acquisition unit 301 is configured to obtain the original image of the display image in the display panel, the first processing unit 302 is configured to perform the first filtering process on the original image to obtain the first filtered image, the calculation unit 303 is configured to perform the difference calculation between the original image and the first filtered image to obtain the edge information image, the determination unit 304 is configured to determine the filtering parameters of the second filtering process based on the maximum pixel value of the edge information image, the second processing unit 305 is configured to perform the second filtering process on the original image according to the filtering parameters to obtain the edge blurred image, and the display unit 306 is configured to display the edge blurred image. The display method of the present disclosure performs the gray-scale compensation on each data line, which prevents a problem of color crosstalk. At the same time, in the present disclosure, the original image in the display panel is edge blurred, which can reduce an impact of the color crosstalk.

Figure 5:
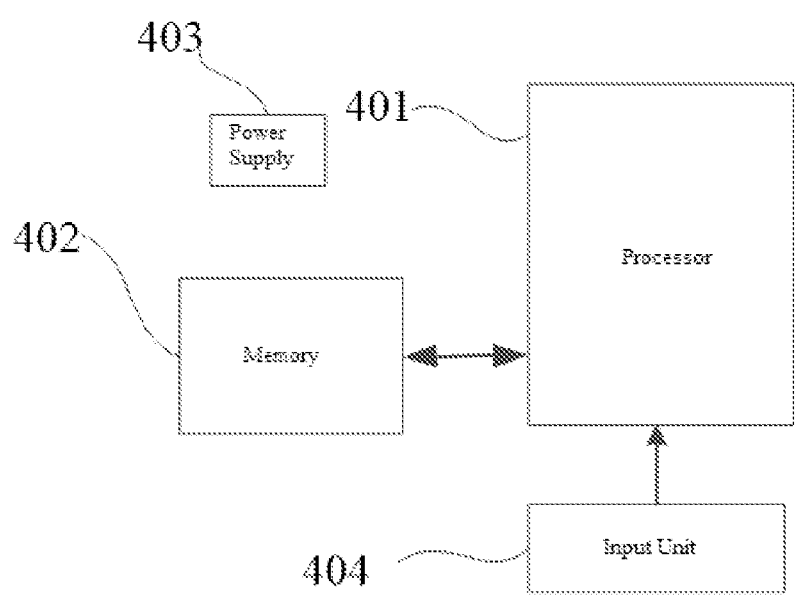
FIG. 5 is a schematic structural diagram of the display panel provided by the embodiment of the present disclosure.

The embodiment of the present disclosure also provides a display panel, as shown in FIG. 5, which shows a schematic structural diagram of the display panel involved in the embodiment of the present disclosure, specifically:

The display panel may comprise a processor 401 including one or more processing cores, a memory 402 including one or more storage media, a power supply 403, an input unit 404, and other components. Those skilled in the art can understand that a structure of the display panel shown in FIG. 5 does not constitute a limitation on the display panel, and may comprise more or fewer components than those shown in the figure, or a combination of certain components, or different component arrangements. Wherein:

The processor 401 is a control center of the display panel, which uses various interfaces and lines to connect various parts of an entire display panel, performs various functions of the display panel and processes data by running or executing software programs and/or modules stored in the memory 402 and calling data stored in the memory 402, so as to monitor the display panel as a whole. Alternatively, the processor 401 may comprise one or more processing cores; preferably, the processor 401 may integrate an application processor and a modem processor, wherein the application processor mainly processes an operating system, user interfaces, application programs, etc. The modem processor mainly deals with wireless communications. It can be understood that foregoing modem processor may not be integrated into the processor 401.

The memory 402 may be configured to store the software programs and the modules. The processor 401 executes various functional applications and data processing by running the software programs and modules stored in the memory 402. The memory 402 may mainly comprise a program storage area and a data storage area. Wherein, the program storage area may store the operating system, the application programs required by at least one function (such as a sound playback function, an image playback function, etc.), etc. The data storage area may store data created by use of the display panel, etc. In addition, the memory 402 may comprise a high-speed random-access memory, and may also comprise a non-volatile memory, such as at least one magnetic disk storage device, a flash memory device, or other volatile solid-state storage devices. Correspondingly, the memory 402 may also comprise a memory controller to provide the processor 401 with access to the memory 402.

The display panel also comprises the power supply 403 for supplying power to various components. Preferably, the power supply 403 may be logically connected to the processor 401 through a power management system, so that functions such as charging, discharging, and power consumption management can be managed through the power management system. The power supply 403 may also comprise any components such as one or more direct current or alternating current power supplies, a recharging system, a power-failure detection circuit, a power converter or inverter, and a power status indicator.

The display panel may further comprise the input unit 404, which can be configured to receive input digital or character information and generate signal inputs of a keyboard, a mouse, a joystick, an optical mouse, or a trackball related to user settings and function control.

Although not shown, the display panel may also comprise a display processor, etc., which will not be repeated here. Specifically, in this embodiment, the processor 401 in the display panel will load executable files corresponding to process of one or more application programs into the memory 402 according to following instructions, and the processor 401 will run the application programs stored in the memory 402, thereby realizing the various functions:

Obtaining the original image of the display image in the display panel, performing the first filtering process on the original image to obtain the first filtered image, performing the difference calculation between the original image and the first filtered image to obtain the edge information image, determining the filtering parameters based on the maximum pixel value of the edge information image, performing the second filtering process on the original image according to the filtering parameters to obtain the edge blurred image, and displaying the edge blurred image.

The embodiment of the present disclosure performs the first filtering process on the original image to obtain the first filtered image, performs the difference calculation between the original image and the first filtered image to obtain the edge information image, determines the filtering parameters of the second filtering process based on the maximum pixel value of the edge information image, performs the second filtering process on the original image according to the filtering parameters to obtain the edge blurred image, and displays the edge blurred image. The image display method of the present disclosure performs the gray-scale compensation on each data line, which prevents the problem of the color crosstalk. At the same time, in the present disclosure, the original image in the display panel is edge blurred, which can reduce the impact of the color crosstalk.

Those of ordinary skill in the art can understand that all or part of steps in various methods of foregoing embodiments can be completed by instructions, or related hardware controlled by the instructions, and the instructions can be stored in a computer-readable storage medium, which can be loaded and executed by the processor.

To this end, an embodiment of the present disclosure provides a storage medium in which a plurality of the instructions are stored, and the instructions can be loaded by a processor to execute steps in any image display methods provided in the embodiments of the present disclosure. For example, the instruction can perform following steps:

Obtaining the original image of the display image in the display panel, performing the first filtering process on the original image to obtain the first filtered image, performing the difference calculation between the original image and the first filtered image to obtain the edge information image, determining the filtering parameters based on the maximum pixel value of the edge information image, performing the second filtering process on the original image according to the filtering parameters to obtain the edge blurred image, and displaying the edge blurred image.

For specific implementation of each of above operations, refer to previous embodiments, which will not be repeated here.

Wherein, the storage medium may comprise: a read-only memory (ROM), a random-access memory (RAM), a magnetic disk, or an optical disk, etc.

Since the instructions stored in the storage medium can execute the steps in any image display method provided by the embodiments of the present disclosure, it can achieve beneficial effects that can be achieved by any image display method provided by the embodiments of the present disclosure. For the beneficial effects, see the previous embodiments for details, and will not be repeated here.

In above-mentioned embodiments, descriptions of each embodiment have its own focus. For a part that is not described in detail in an embodiment, please refer to detailed description of image display method above, which will not be repeated here.

The image display method and image display device provided by the embodiments of the present disclosure are described in detail above. Specific examples are used in the present disclosure to illustrate principles and implementation of the present disclosure. The description of the above embodiments is only used to help understand the present disclosure. At the same time, for those skilled in the art, according to an idea of the present disclosure, there will be changes in specific implementation and scope of application. In summary, content of this specification should not be construed as a limitation to the present disclosure.

What is claimed is:

1. An image display method for reducing crosstalk, which comprises following steps:
    obtaining an original image of a display image displayed on a display panel;
    performing a first filtering process on the original image to obtain a first filtered image;
    performing a difference calculation on the original image and the first filtered image to obtain an edge information image;
    determining filtering parameters of a second filtering process based on a maximum pixel value of the edge information image;
    performing the second filtering process on the original image according to the filtering parameters to obtain an edge blurred image; and
    displaying the edge blurred image;
    wherein the first filtering process is a mean filtering process;
    wherein the step of determining the filtering parameters of the second filtering process based on the maximum pixel value of the edge information image comprises:
    forming a filter of five rows and five columns through preprocessing, wherein a pixel value of each position point in the filter represents the filtering parameters, and the filtering parameters comprise a center parameter and edge parameters; and
    by following formulas, performing a conversion calculation on the maximum pixel value of the edge information image to obtain values of the center parameter and the edge parameters:
    $B=1-P/255$;
    $A=P/255/24$;
    wherein B denotes the center parameter, A denotes each of the edge parameters, and P denotes the maximum pixel value of the edge information image.

2. The image display method according to claim 1, wherein the step of performing the first filtering process on the original image to obtain the first filtered image comprises:
    performing a mean filtering process of three rows and three columns on each pixel in the original image to obtain the first filtered image.

3. The image display method according to claim 1, wherein the step of performing the second filtering process on the original image according to the filtering parameters to obtain the edge blurred image comprises:
    performing a summation calculation of the original image and the filtering parameters to obtain the edge blurred image.

4. The image display method according to claim 1, wherein before the step of displaying the edge blurred image, the image display method further comprises following step:
    performing a gray-scale compensation on pixels corresponding to data lines to be compensated in the display panel;
    the step of displaying the edge blurred image comprises:
    displaying the edge blurred image by the pixels after the gray-scale compensation.

5. The image display method according to claim 4, wherein the step of performing the gray-scale compensation on the pixels corresponding to the data lines to be compensated in the display panel comprises following steps:
    determining a coordinate value of each of the data lines to be compensated in a vertical axis direction;
    calculating an average gray-scale of all data lines greater than the coordinate value in the vertical axis direction to obtain a first average gray-scale;
    calculating an average gray-scale of all data lines less than the coordinate value in the vertical axis direction to obtain a second average gray-scale;
    calculating a compensated gray-scale according to the first average gray-scale and the second average gray-scale; and
    performing the gray-scale compensation on the pixels corresponding to each of the data lines to be compensated based on the compensated gray-scale.

6. The image display method according to claim 5, wherein the step of calculating the compensated gray-scale according to the first average gray-scale and the second average gray-scale comprises: performing the difference calculation on the first average gray-scale and the second average gray-scale to obtain the compensated gray-scale.

7. The image display method according to claim 5, wherein the step of calculating the compensated gray-scale according to the first average gray-scale and the second average gray-scale comprises:

subtracting the second average gray-scale from the first average gray-scale and multiplying by a floating parameter to obtain the compensated gray-scale, wherein the floating parameter is between 0 and 5.

8. The image display method according to claim 5, wherein before the step of determining the coordinate value of each of the data lines to be compensated in the vertical axis direction comprises:
counting a horizontal axis coordinate and a vertical axis coordinate of each data line.

9. An image display device for reducing crosstalk, comprising:
a memory configured to store software programs and modules;
a processor configured to run the software programs and the modules to cause the image display device to perform operations comprising:
obtaining an original image of a display image in a display panel;
performing a first filtering process on the original image to obtain a first filtered image, wherein the first filtering process is a mean filtering process;
subtracting the first filtered image from the original image to obtain an edge information image;
determining filtering parameters of a second filtering process based on a maximum pixel value of the edge information image;
performing the second filtering process on the original image according to the filtering parameters to obtain an edge blurred image;
performing a gray-scale compensation on data lines to be compensated in the display panel; and
displaying the edge blurred image;
wherein the step of determining the filtering parameters of the second filtering process based on the maximum pixel value of the edge information image comprises:
forming a filter of five rows and five columns through preprocessing, wherein a pixel value of each position point in the filter represents the filtering parameters, and the filtering parameters comprise a center parameter and edge parameters; and
by following formulas, performing a conversion calculation on the maximum pixel value of the edge information image to obtain values of the center parameter and the edge parameters:
$B=1-P/255$;
$A=P/255/24$;
wherein B denotes the center parameter, A denotes each of the edge parameters, and P denotes the maximum pixel value of the edge information image.

10. The image display device according to claim 9, wherein the operations further comprise: performing a mean filtering process of three rows and three columns on each pixel in the original image to obtain the first filtered image.

11. The image display device according to claim 9, wherein the operations further comprise: subtracting each pixel of the first filtered image from each pixel of the original image to obtain the edge information image.

12. The image display device according to claim 9, wherein the operations further comprise: performing a summation calculation of the original image and the filtering parameters to obtain the edge blurred image.

13. The image display device according to claim 9, wherein the operations further comprise:
determining a coordinate value of each of the data lines to be compensated in a vertical axis direction;
calculating an average gray-scale of all data lines greater than an average gray-scale value to obtain a first average gray-scale;
calculating an average gray-scale of all data lines less than the average gray-scale value to obtain a second average gray-scale;
calculating a compensated gray-scale according to the first average gray-scale and the second average gray-scale; and
performing the gray-scale compensation on each of the data lines based on the compensated gray-scale.

14. The image display device according to claim 13, wherein the operations further comprise: counting a horizontal axis coordinate and a vertical axis coordinate of each of the data lines.

15. The image display device according to claim 13, wherein the operations further comprise: performing a difference calculation between the first average gray-scale and the second average gray-scale to obtain the compensated gray-scale.

16. The image display device according to claim 13, wherein the operations further comprise: subtracting the second average gray-scale from the first average gray-scale and multiplying by a floating parameter to obtain the compensated gray-scale, wherein the floating parameter is between 0 and 5.

17. A non-transitory machine readable storage medium, wherein the storage medium stores a plurality of instructions, and the instructions are suitable for loading by a processor to execute steps in an image display method for reducing crosstalk, which comprises following steps:
obtaining an original image of a display image displayed on a display panel;
performing a first filtering process on the original image to obtain a first filtered image, wherein the first filtering process is a mean filtering process;
performing a difference calculation on the original image and the first filtered image to obtain an edge information image;
determining filtering parameters of a second filtering process based on a maximum pixel value of the edge information image;
performing the second filtering process on the original image according to the filtering parameters to obtain an edge blurred image; and
displaying the edge blurred image;
wherein the step of determining the filtering parameters of the second filtering process based on the maximum pixel value of the edge information image comprises:
forming a filter of five rows and five columns through preprocessing, wherein a pixel value of each position point in the filter represents the filtering parameters, and the filtering parameters comprise a center parameter and edge parameters; and
by following formulas, performing a conversion calculation on the maximum pixel value of the edge information image to obtain values of the center parameter and the edge parameters:
$B=1-P/255$;
$A=P/255/24$;
wherein B denotes the center parameter, A denotes each of the edge parameters, and P denotes the maximum pixel value of the edge information image.

* * * * *